United States Patent
Park et al.

(10) Patent No.: US 11,482,720 B2
(45) Date of Patent: Oct. 25, 2022

(54) MEMBRANE-ELECTRODE ASSEMBLY WITH IMPROVED DURABILITY AND PROTON CONDUCTIVITY AND METHOD FOR MANUFACTURING THE SAME

(71) Applicants: HYUNDAI MOTOR COMPANY, Seoul (KR); KIA MOTORS CORPORATION, Seoul (KR); INDUSTRY FOUNDATION OF CHONNAM NATIONAL UNIVERSITY, Gwangju (KR)

(72) Inventors: In Yu Park, Seoul (KR); Bo Ki Hong, Seoul (KR); Jae Woon Hong, Gurye-eup (KR); Aniket Kumar, Gwangju (KR); Sun Ju Song, Gwangju (KR)

(73) Assignees: HYUNDAI MOTOR COMPANY, Seoul (KR); KIA MOTORS CORPORATION, Seoul (KR); INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 0 days.

(21) Appl. No.: 17/065,140

(22) Filed: Oct. 7, 2020

(65) Prior Publication Data

US 2021/0135264 A1   May 6, 2021

(30) Foreign Application Priority Data

Nov. 1, 2019 (KR) ........................ 10-2019-0138258

(51) Int. Cl.
| | | |
|---|---|---|
| *H01M 8/1027* | (2016.01) | |
| *H01M 8/1004* | (2016.01) | |
| *H01M 8/1081* | (2016.01) | |
| *H01M 8/1053* | (2016.01) | |
| *H01M 8/10* | (2016.01) | |

(52) U.S. Cl.
CPC ....... *H01M 8/1027* (2013.01); *H01M 8/1004* (2013.01); *H01M 8/1053* (2013.01); *H01M 8/1081* (2013.01); *H01M 2008/1095* (2013.01)

(58) Field of Classification Search
CPC ............ H01M 8/1027; H01M 8/1004; H01M 8/1053; H01M 8/1081
See application file for complete search history.

(56) References Cited

U.S. PATENT DOCUMENTS

2014/0093808 A1* 4/2014 Frey ........................ C08J 5/2237
429/494

OTHER PUBLICATIONS

Yamato et al. (J. Chem. Research (S), 2002, 400-402).*
Curtin, D.E., et al., "Advanced materials for improved PEMFC performance and life," Journal of Power Sources, vol. 131, pp. 41-48 (2004).

(Continued)

*Primary Examiner* — Olatunji A Godo
(74) *Attorney, Agent, or Firm* — McDonnell Boehnen Hulbert & Berghoff LLP

(57) ABSTRACT

Disclosed are a membrane-electrode assembly and a method for manufacturing the same. The membrane-electrode assembly has durability and proton conductivity which are improved by employing an ion conductive polymer having improved chemical durability and ion conductivity.

14 Claims, 5 Drawing Sheets

(56) References Cited

OTHER PUBLICATIONS

Young, A.P., et al., "Ionomer Degradation in Polymer Electrolyte Membrane Fuel Cells," Journal of The Electrochemical Society, vol. 157, pp. B425-B436 (2010).

Trogadas, P. et al., "Degradation Mitigation in Polymer Electrolyte Membranes Using Cerium Oxide as a Regenerative Free-Radical Scavenger," Electrochemical and Solid-State Letters, vol. 11, pp. B113-B116 (2008).

Uegaki, R., et al., "Radical-induced degradation mechanism of perfluorinated polymer electrolyte membrane," Journal of Power Sources, vol. 196, pp. 9856-9986 (2011).

Zhao, D., et al., "Cesium substituted 12-tungstophosphoric ($Cs_xH_{3-x}PW_{12}O_{40}$) loaded on ceria-degradation mitigation in polymer electrolyte membranes," Journal of Power Sources, vol. 190, pp. 301-306 (2009).

\* cited by examiner

MEMBRANE-ELECTRODE ASSEMBLY WITH IMPROVED DURABILITY AND PROTON CONDUCTIVITY AND METHOD FOR MANUFACTURING THE SAME

CROSS REFERENCE TO RELATED APPLICATIONS

This application claims under 35 U.S.C. § 119(a) the benefit of priority to Korean Patent Application No. 10-2019-0138258 filed on Nov. 1, 2019, the entire contents of which are incorporated herein by reference.

BACKGROUND

(a) Technical Field

The present disclosure relates to a membrane-electrode assembly and a method for manufacturing the same. More particularly, it relates to a membrane-electrode assembly with durability and proton conductivity which are greatly improved by employing an ion conductive polymer having excellent chemical durability and proton conductivity.

(b) Background Art

A polymer electrolyte membrane fuel cell for vehicles is an electricity generator which produces electricity using electrochemical reaction between hydrogen and oxygen in air, and is known as an eco-friendly next-generation energy source which has high electricity generation efficiency and does not produce any effluent other than water. Further, the polymer electrolyte membrane fuel cell generally operates at a temperature of 95° C. or less, and may obtain high power density. Such reaction for generating electricity of the fuel cell occurs in a membrane-electrode assembly (MEA) including a perfluorinated sulfonic acid (PFSA) ionomer-based electrolyte membrane and electrodes, i.e., an anode and a cathode.

Hydrogen supplied to an oxidation electrode, i.e., the anode, of the fuel cell is separated into protons and electrons. The protons move to a reduction electrode, i.e., the cathode, through the membrane, and the electrons moves to the cathode through an external circuit. In the cathode, oxygen molecules, the protons and the electrons react with each other, and thus produce electricity and heat and simultaneously produce water ($H_2O$) as a reaction by-product.

In general, hydrogen and oxygen in air, which are reaction gases of the fuel cell, promote generation of hydrogen peroxide (HOOH) by crossover through the electrolyte membrane. Such hydrogen peroxide may generate oxygen-containing radicals, such as a hydroxyl radical (.OH), a hydroperoxyl radical (.OOH), etc. These radicals attack a perfluorinated sulfonic acid (PFSA) ionomer-based electrolyte membrane, thereby causing chemical degradation of the perfluorinated sulfonic acid (PFSA) ionomer-based electrolyte membrane and consequently reducing durability of a fuel cell (D. E. Curtin et al., J. Power Sources, 131, 41-48 (2004); A. P. Young et al., J. Electrochem. Soc., 157, B425-B436 (2010); P. Trogadas et al., Electrochem. Solid-State Lett., 11, B113-B116 (2008); R. Uegaki et al., J. Power Sources, 196, 9856-9861 (2011); D. Zhao et al., J. Power Sources, 190, 301-306 (2009)).

As technology for mitigation of such chemical degradation of the conventional electrolyte membrane and membrane-electrode assembly, a method for adding various kinds of antioxidants to the electrolyte membrane has been proposed. Here, antioxidants, such as cerium (III) nitride hexahydrate, are mainly used.

However, in this case, cerium ions are combined with the terminals of sulfonic acid groups of a perfluorinated sulfonic acid ionomer, and block a path along which protons ($H^+$) may move. Thereby, chemical durability of the electrolyte membrane is improved, but proton conductivity of the electrolyte membrane is reduced.

SUMMARY

The present disclosure has been made in an effort to solve the above-described problems associated with the prior art and it is an object of the present disclosure to provide a membrane-electrode assembly having greater chemical durability and proton conductivity than an electrolyte membrane based on a perfluorinated sulfonic acid (PFSA) ionomer, such as Nafion™.

In one aspect, the present disclosure provides a membrane-electrode assembly including an electrolyte membrane, and a pair of electrodes formed on both surfaces of the electrolyte membrane, wherein at least one of the electrolyte membrane or the pair of electrodes includes an ion conductive polymer having proton conductive groups, wherein a compound expressed in the chemical formula $MA_x$ is combined with all or some of the proton conductive groups, where M is a lanthanoid, A is a hydrophilic functional group, and X is a number necessary to maintain a charge balance between A and M.

In one embodiment, the proton conductive group may include a sulfonic acid group.

In another embodiment, the ion conductive polymer may include one selected from the group consisting of perfluorosulfonic acid, sulfonated poly(aryl ether ketone), sulfonated poly(arylene ether sulfone) and combinations thereof.

In still another embodiment, M may be cerium, and the hydrophilic functional group may include one selected from the group consisting of a hydroxyl group, a carboxyl group and a combination thereof.

In yet another embodiment, the compound expressed in the chemical formula $MA_x$ may include cerium hydroxide ($Ce(OH)_3$).

In still yet another embodiment, the ion conductive polymer may include a carbon skeleton and a side chain expressed in the structural formula:

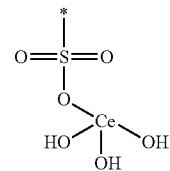

where * may mean an element of the carbon skeleton or an element of the side chain connected to sulfur (S).

In a further preferred embodiment, the ion conductive polymer may include a porous reinforcing layer configured to be impregnated with the ion conductive polymer, and an ion transport layer provided to at least one surface of the reinforcing layer and including the ion conductive polymer.

In another aspect, the present disclosure provides a method for manufacturing a membrane-electrode assembly, the method including preparing a dispersion liquid including a cerium precursor, preparing a mixture including the dispersion liquid and an ion conductive polymer including proton conductive groups, adding an acid solution to the mixture and reacting the mixture with the acid solution so as to combine cerium hydroxide ($Ce(OH)_3$) with all or some of the proton conductive groups, manufacturing an electrolyte membrane as a product of the reaction, and forming electrodes on both surfaces of the electrolyte membrane.

In one embodiment, the cerium precursor may include one selected from the group consisting of cerium isopropoxide ($Ce(OC_3H_7)_4$, cerium (III) acetate hydrate ($Ce(CH_3CO_2)_3 \cdot xH_2O$), cerium (III) acetylacetonate hydrate ($Ce(C_5H_7O_2)_3 \cdot xH_2O$), cerium (III) oxalate hydrate ($Ce_2(C_2O_4)_3 \cdot xH_2O$), cerium trifluoromethanesulfonate ($Ce_n(CF_3SO_3)_x \cdot H_2O$) and combinations thereof.

In another embodiment, the dispersion liquid may be prepared by dispersing the cerium precursor in a polar solvent including one selected from the group consisting of isopropanol, dimethylformamide and a combination thereof.

In still another embodiment, the dispersion liquid may be prepared by putting the cerium precursor into a solvent and then agitating an obtained mixture for 10 to 600 minutes.

In yet another embodiment, a content of the cerium precursor included in the mixture may be 0.01 to 20 wt % with respect to a total content of the cerium precursor and the ion conductive polymer.

In still yet another embodiment, the mixture may be prepared by mixing the dispersion liquid and the ion conductive polymer including the proton conductive groups and then agitating the mixed dispersion liquid and ion conductive polymer for 10 to 300 minutes.

In a further embodiment, the acid solution may be added to the mixture and the mixture may be reacted with the acid solution at a temperature of 50° C. to 150° C. for 1 to 45 hours.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
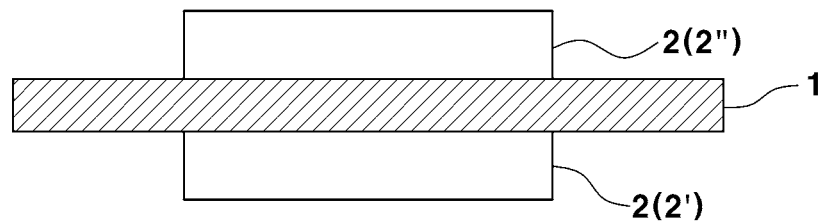
FIG. 1 is a cross-sectional view briefly illustrating a membrane-electrode assembly in accordance with the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawings.

DETAILED DESCRIPTION

Hereinafter reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments within the spirit and scope of the disclosure as defined by the appended claims.

In the following description of the embodiments, the same elements are denoted by the same reference numerals even though they are depicted in different drawings. In the drawings, dimensions of structures are exaggerated as compared to actual dimensions thereof, for clarity of description. In the following description of the embodiments, terms, such as "first", "second", etc., may be used to describe various elements but do not limit the elements. These terms are used only to distinguish one element from other elements. For example, a first element may be named a second element and similarly the second element may be named the first element, within the spirit and scope of the disclosure. Singular expressions may encompass plural expressions, unless they have clearly different contextual meanings.

In the following description of the embodiments, terms, such as "including", "having", etc., will be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between both parts. In the same manner, it will be understood that, when a part, such as a layer, a film, a region or a plate, is said to be "under" another part, the part may be located "directly under" the other part or other parts may be interposed between both parts.

All numbers, values and/or expressions representing amounts of components, reaction conditions, polymer compositions and blends used in the description are approximations in which various uncertainties in measurement generated when these values are acquired from essentially different things are reflected and thus, it will be understood that they are modified by the term "about", unless stated otherwise. In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

FIG. 1 is a cross-sectional view briefly illustrating a membrane-electrode assembly in accordance with the present disclosure. Referring to FIG. 1, the membrane-electrode assembly includes an electrolyte membrane 1 and a pair of electrodes 2 provided on both surfaces of the electrolyte membrane 1. Here, "a pair of electrodes" means an anode and a cathode, which are located opposite each other with the electrolyte membrane 1 interposed therebetween.

Figure 2:
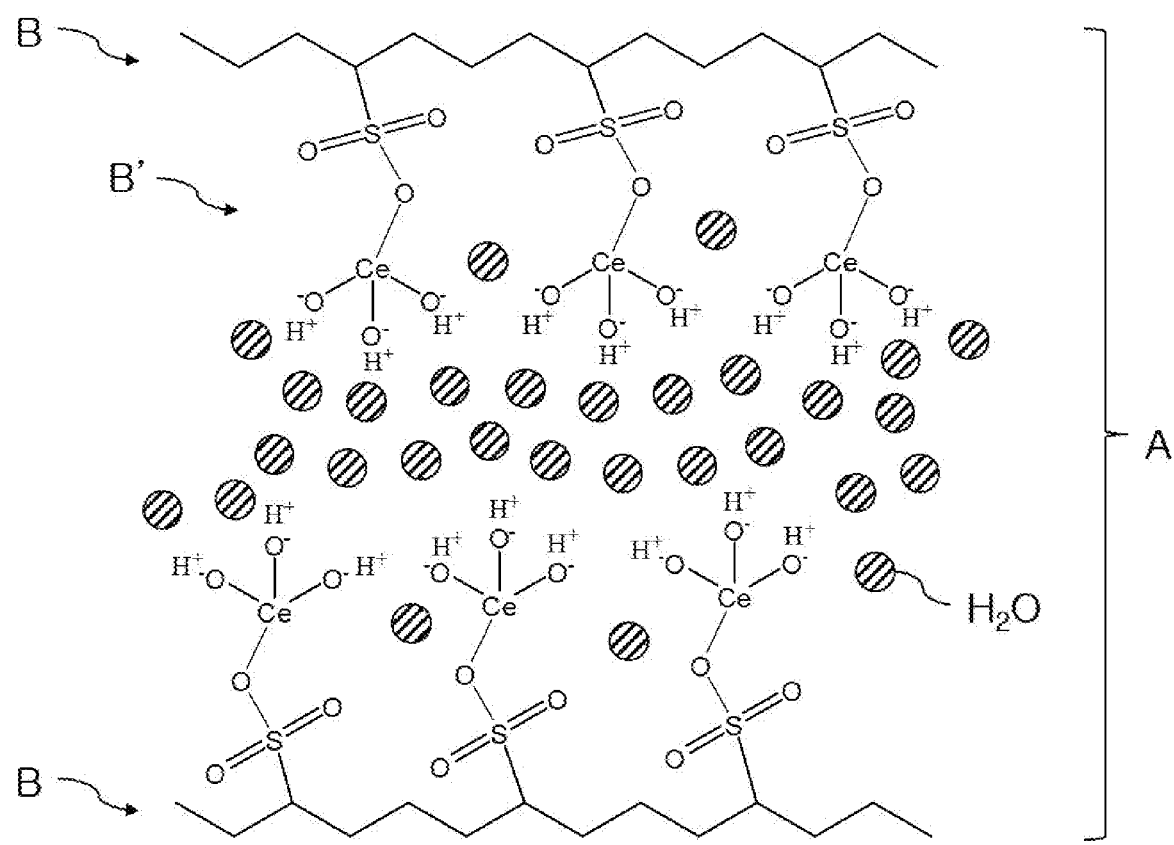
FIG. 2 is a view schematically illustrating a proton-conducting channel in an electrolyte membrane in accordance with the present disclosure.

FIG. 2 is a view schematically illustrating a proton-conducting channel A in the electrolyte membrane 1 in accordance with the present disclosure. The proton-conducting channel A is composed of main chains B forming an ion conductive polymer and side chains B' continuously arranged along the main chains B. In more detail, the electrolyte membrane 1 is impregnated with moisture ($H_2O$) through functional groups of the side chains B', and thus the proton-conducting channel A is formed.

Hereinafter, referring to FIG. 2, the ion conductive polymer will be described in detail. For reference, FIG. 2 illustrates one example of the ion conductive polymer, and the chemical structure of the ion conductive polymer is not limited thereto.

The ion conductive polymer may be a polymer having proton conductive groups. Here, having the proton conductive groups may mean that the main chains of the ion conductive polymer are provided with the proton conductive groups as functional groups.

The proton conductive group may include a sulfonic acid group without being limited thereto.

The ion conductive polymer having the proton conductive groups may include one selected from the group consisting of perfluorosulfonic acid, sulfonated poly(aryl ether ketone), sulfonated poly(arylene ether sulfone) and combinations thereof, without being limited thereto.

The ion conductive polymer in accordance with the present disclosure is characterized in that all or some of the proton conductive groups are combined with a compound expressed as the following chemical formula:

$$MA_x$$

Here, M may be a lanthanoid, and particularly, cerium (Ce).

A may be a hydrophilic functional group, and particularly, one selected from the group consisting of a hydroxyl group, a carboxyl group and a combination thereof.

X may be a number which is necessary to maintain a charge balance between A and M.

In more detail, the compound expressed in chemical formula 1 may be cerium hydroxide ($Ce(OH)_3$), as shown in FIG. 2. In this case, the ion conductive polymer may include a carbon skeleton and a side chain expressed in the following structural formula:

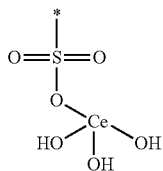

Here, * means an element of the carbon skeleton or an element of the side chain connected to sulfur (S). That is, the structural formula above may be a structural formula expressing a part of the side chain, or a structural formula expressing the entirety of the side chain.

As the compound expressed in the chemical formula above is combined with the proton conductive groups provided in the ion conductive polymer, the proton-conducting channel A is expanded. Thereby, moisture more easily passes through the ion-conducting channel A, and proton conductivity of the electrolyte membrane 1 is greatly improved.

Further, if cerium hydroxide ($Ce(OH)_3$) is used as the compound expressed in $MA_x$, cerium hydroxide ($Ce(OH)_3$) suppresses chemical degradation of the polymer electrolyte membrane 1 caused by a hydroxyl or hydroperoxyl radical, and thus, chemical durability of the electrolyte membrane 1 is greatly improved.

Figure 3:
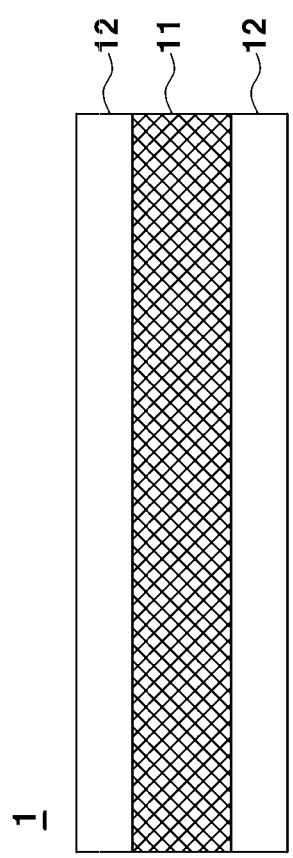
FIG. 3 is a cross-sectional view schematically illustrating an electrolyte membrane in accordance with another embodiment of the present disclosure.

FIG. 3 is a cross-sectional view schematically illustrating an electrolyte membrane 1 in accordance with another embodiment of the present disclosure. Referring to FIG. 3, the electrolyte membrane 1 may include a porous reinforcing layer 11, and ion transport layers 12 provided to at least one surface of the reinforcing layer 11.

The reinforcing layer 11 serves to increase mechanical stiffness of the electrolyte membrane 1. The reinforcing layer 11 may be formed of one selected from the group consisting of polytetrafluoroethylene (PTFE), expanded polytetrafluoroethylene (e-PTFE), polyethylene (PE), polypropylene (PP), poly(phenylene oxide) (PPO), polybenzimidazole (PBI), polyimide (PI), polyvinylidene fluoride (PVdF), polyvinyl chloride (PVC) and combinations thereof, and be a porous membrane having a great number of pores.

The reinforcing layer 11 may be a layer which is impregnated with the above-described ion conductive polymer. Further, the ion transport layer 12 may include the ion conductive polymer.

The electrodes 2 include an anode 2' which is reacted with hydrogen gas, and a cathode 2" which is reacted with oxygen gas in air.

The anode 2' splits hydrogen into protons and electrons through hydrogen oxidation reaction (HOR). The protons move to the cathode 2" through the electrolyte membrane 1 contacting the anode 2'. The electrons move to the cathode 2" through an external line (not shown).

The electrodes 2 may include catalyst particles, such as carbon-supported platinum (Pt) or the like. Further, the electrodes 2 may include the above-described ion conductive polymer so as to conduct protons in the electrodes 2. However, the electrodes 2 may include a different kind of ionomer from the ion conductive polymer.

Figure 4:
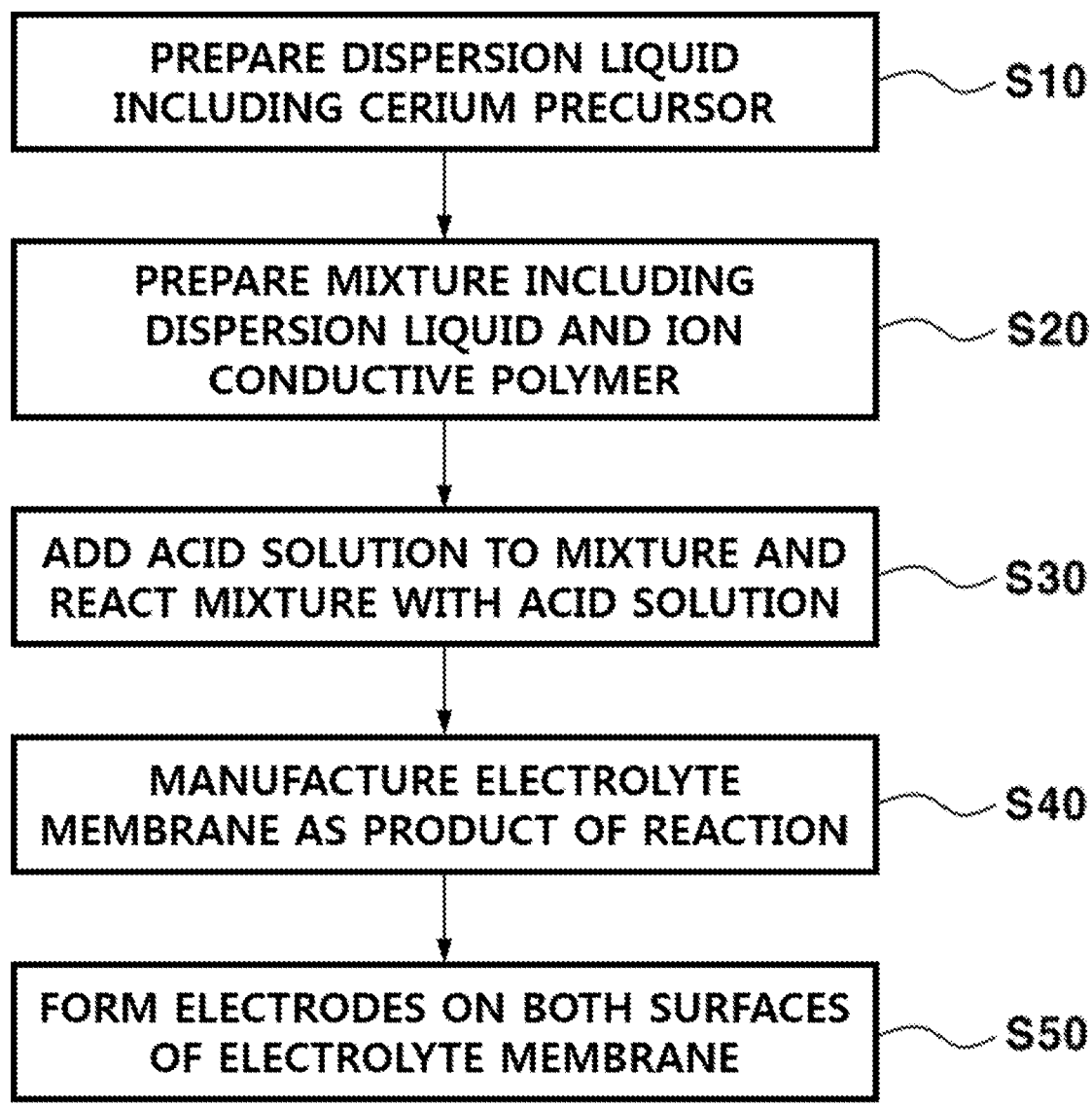
FIG. 4 is a flowchart representing a method for manufacturing a membrane-electrode assembly in accordance with the present disclosure.

FIG. 4 is a flowchart representing a method for manufacturing a membrane-electrode assembly in accordance with the present disclosure. Referring to FIG. 4, the method includes preparing a dispersion liquid including a cerium precursor at S10, preparing a mixture including the dispersion liquid and an ion conductive polymer including proton conductive groups at S20, adding an acid solution to the mixture and reacting the mixture with the acid solution at S30, manufacturing an electrolyte membrane as a product of the reaction at S40 and forming electrodes on both surfaces of the electrolyte membrane at S50.

The dispersion liquid may be prepared by dispersing the cerium precursor into a polar solvent at S10.

The cerium precursor may include one selected from the group consisting of cerium isopropoxide ($Ce(OC_3H_7)_4$, cerium (III) acetate hydrate ($Ce(CH_3CO_2)_3 \cdot xH_2O$), cerium (III) acetylacetonate hydrate ($Ce(C_5H_7O_2)_3 \cdot xH_2O$), cerium (III) oxalate hydrate ($Ce_2(C_2O_4)_3 \cdot xH_2O$), cerium trifluoromethanesulfonate ($Ce_n(CF_3SO_3)_x \cdot H_2O$) and combinations thereof.

The polar solvent may include one selected from the group consisting of isopropanol, dimethylformamide and a combination thereof, and particularly, a mixed solvent of isopropanol and dimethylformamide may be used.

The dispersion liquid may be prepared by putting the cerium precursor into the solvent and agitating an obtained mixture for 10 to 600 minutes, particularly, 30 to 300 minutes. Such a dispersion method is not limited to a specific method, and, for example, the dispersion liquid may be agitated at a regular speed using a magnetic bar. However, when the agitating time is excessively short, the cerium precursor may not be sufficiently dispersed, and when the agitating time is excessively long, processability may be lowered, and a mixing composition which is originally intended may be changed due to evaporation of isopropanol which volatile alcohol.

The mixture may be prepared by mixing and agitating the dispersion liquid and the ion conductive polymer including the proton conductive groups at S20.

The ion conductive polymer including the proton conductive groups has been described above, and a detailed description thereof will thus be omitted.

The mixture may be prepared by weighing respective components such that the content of the cerium precursor is 0.01 to 20 wt %, particularly 0.1 to 10 wt %, with respect to the total content of the cerium precursor and the ion conductive polymer. Here, the content of the ion conductive polymer may mean the content of the ion conductive polymer in a solid phase. When the content of the cerium precursor is excessively small, the above-described chemical durability and proton conductivity rising effects may be insignificant, and when the content of the cerium precursor is excessively large, mechanical strength of the electrolyte membrane, etc. may be lowered and dimensional stability of the electrolyte membrane may be lowered due to excessive swelling.

The mixture may be prepared by mixing the dispersion liquid and the ion conductive polymer and then agitating the same for 10 to 300 minutes, particularly 30 to 120 minutes. When the agitating time is too short, the respective components may not be uniformly dispersed, and when the agitating time is too long, processability may be lowered and the cerium precursor may be decomposed.

Thereafter, cerium hydroxide caused by the cerium precursor may be combined with all or some of the proton conductive groups of the ion conductive polymer by adding the acid solution to the mixture and reacting the mixture with the acid solution at S30.

In more detail, when deionized water and the acid solution are added to the mixture, the temperature of the mixture is raised to a specific temperature and then the mixture is reacted for a designated time, the cerium precursor is converted into the form of cerium hydroxide. Cerium hydroxide is reacted and combined with all or some of the proton conductive groups of the ion conductive polymer.

The acid solution may include one selected from the group consisting of hydrochloric acid (HCl), sulfuric acid ($H_2SO_4$), nitric acid ($HNO_3$), phosphoric acid ($H_3PO_4$), hydrogen iodide (HI) and combinations thereof.

Such reaction may be performed at a temperature of 50° C. to 150° C., particularly 80° C. to 120° C. When the reaction temperature is excessively low, a reaction speed is too low, and thus, reaction efficiency may be greatly lowered. On the other hand, when the reaction temperature is excessively high, the ion conductive polymer may be pyrolyzed.

Further, the reaction may be performed for 1 to 24 hours, particularly 2 to 12 hours. When the reaction time is excessively short, the reaction is not sufficiently performed, and thus, reaction efficiency may be greatly lowered. On the other hand, when the reaction time is excessively long, processability may be reduced.

The ion conductive polymer included in a product obtained through the above reaction may include a carbon skeleton and a side chain expressed in the following structural formula:

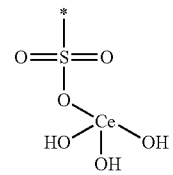

Here, * means an element of the carbon skeleton or an element of the side chain connected to sulfur (S).

The electrolyte membrane may be manufactured using the product of the above reaction at S40. Such an electrolyte membrane manufacturing method is not limited to a specific method, and a conventional method may be employed.

The membrane-electrode assembly may be acquired by attaching a pair of electrodes to both surfaces of the electrolyte membrane at S50. Such an electrode attachment method is not limited to a specific method, and a conventional method may be employed.

Hereinafter, the present disclosure will be described in more detail through detailed examples. However, the following examples illustrate the disclosure and are not intended to limit the scope of the disclosure.

EXAMPLE

A dispersion liquid was prepared by putting cerium isopropoxide ($Ce(OC_3H_7)_4$ as a cerium precursor into a mixed solution of isopropanol and dimethylformamide.

The dispersion liquid and a perfluorinated sulfonic acid dispersion liquid were mixed, such that the content of cerium isopropoxide was 1.0 wt % with respect to the total content of cerium isopropoxide and perfluorinated sulfonic acid in a solid phase. An obtained mixture was agitated at a low temperature (of about 25° C.) for about 2 hours.

Deionized water and hydrochloric acid solution were put into the mixture, and then the mixture was sufficiently reacted at a temperature of about 120° C. for about 12 hours.

After such reaction has been completed, an obtained product was applied to a base material and dried, thereby producing an electrolyte membrane.

Comparative Example

The perfluorinated sulfonic acid dispersion liquid was applied to a base material and dried, thereby producing an electrolyte membrane.

Test Example 1

Fluoride emissions of the electrolyte membranes according to the example and the comparative example were measured. Measurement results are shown in FIG. 5.

Figure 5:
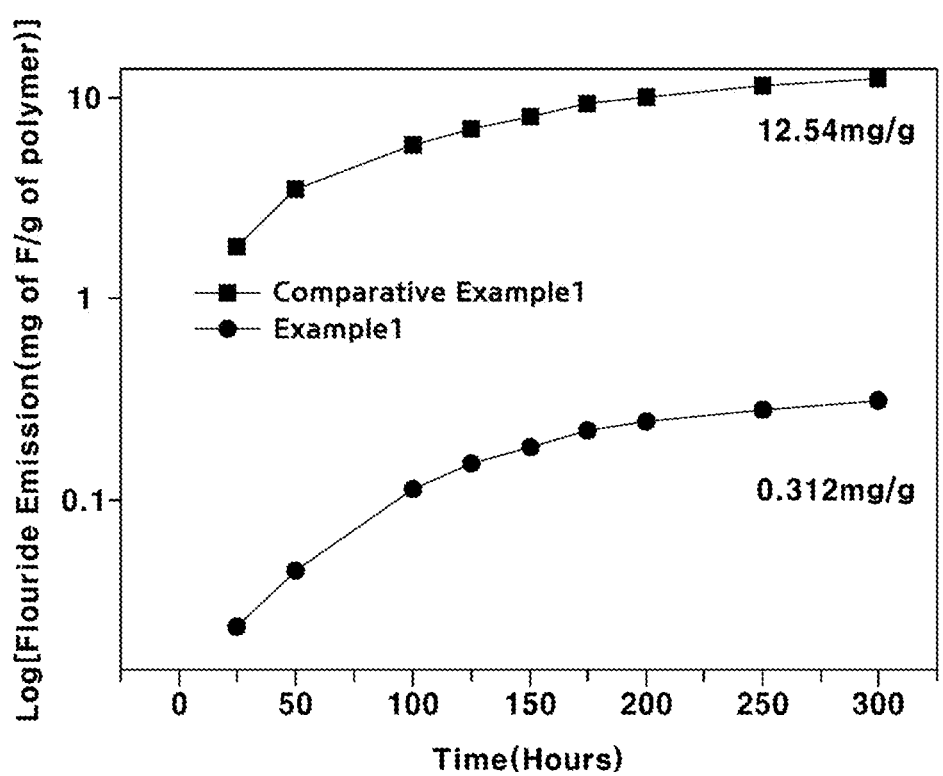
FIG. 5 is a graph illustrating measurement results of fluoride emission quantities of electrolyte membranes in accordance with an example and a comparative example.

Referring to FIG. 5, it may be understood that the fluoride emission of the electrolyte membrane according to the example is remarkably lower than the fluoride emission of the electrolyte membrane according to the comparative example. This means that chemical durability of the electrolyte membrane according to the example is far above chemical durability of the electrolyte membrane according to the comparative example.

Test Example 2

Proton conductivities of the electrolyte membranes according to the example and the comparative example were measured. Measurement of the proton conductivities was performed at a relative humidity of 100% in temperature sections of 40° C. to 90° C. Measurement results are shown in FIG. 6.

Figure 6:
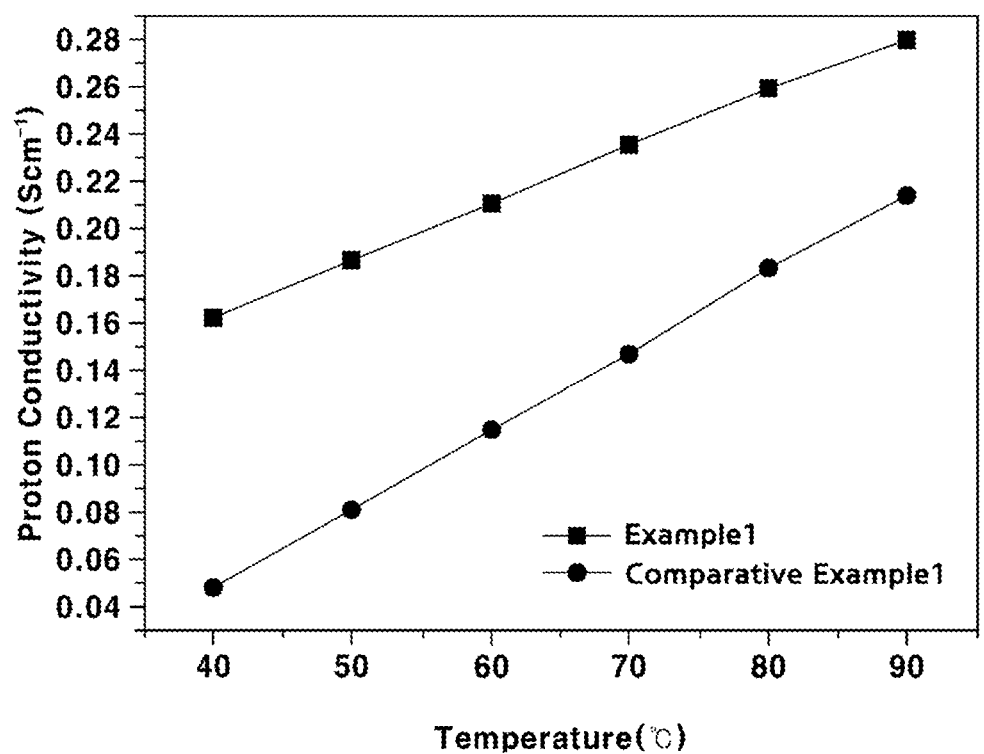
FIG. 6 is a graph illustrating measurement results of proton conductivities of the electrolyte membranes in accordance with the example and the comparative example.

Referring to FIG. 6, it may be understood that the electrolyte membrane according to the example exhibits higher proton conductivity values than the electrolyte membrane according to the comparative example in all of the evaluation temperature sections. Particularly, it may be confirmed that the proton conductivity value of the electrolyte membrane according to the example is much higher than the proton conductivity value of the electrolyte membrane according to the comparative example at a low temperature (of 40° C.).

As is apparent from the above description, the present disclosure may provide an electrolyte membrane having excellent chemical durability and proton conductivity, thus greatly improving durability and performance of a membrane-electrode assembly including the electrolyte membrane.

The electrolyte membrane according to the present disclosure expands the size of a proton-conducting channel due to cerium hydroxide combined with terminals of side chains of an ion conductive polymer, thereby greatly improving proton conductivity of the membrane-electrode assembly.

Further, the electrolyte membrane according to the present disclosure suppresses chemical degradation of the polymer electrolyte membrane caused by a hydroxyl or hydroperoxyl radical, thereby greatly improving chemical durability of the membrane-electrode assembly.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A membrane-electrode assembly comprising:
an electrolyte membrane; and
a pair of electrodes formed on both surfaces of the electrolyte membrane;
wherein at least one of the electrolyte membrane or the pair of electrodes comprises an ion conductive polymer having proton conductive groups;
wherein a compound having a chemical formula of $MA_x$ is combined with all or some of the proton conductive groups,
wherein M is cerium, A is one selected from the group consisting of a hydroxyl group, a carboxyl group, and a combination thereof, and X is a number necessary to maintain a charge balance between A and M;
wherein the ion conductive polymer comprises a carbon skeleton and a side chain of

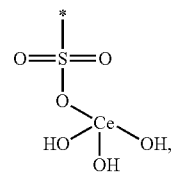

wherein * comprises an element of the carbon skeleton or an element of the side chain connected to sulfur (S).

2. The membrane-electrode assembly of claim 1, wherein the proton conductive group comprises a sulfonic acid group.

3. The membrane-electrode assembly of claim 1, wherein the ion conductive polymer comprises one selected from the group consisting of perfluorosulfonic acid, sulfonated poly (aryl ether ketone), sulfonated poly(arylene ether sulfone) and combinations thereof.

4. The membrane-electrode assembly of claim 1, wherein the compound expressed in the chemical formula $MA_x$ comprises cerium hydroxide ($Ce(OH)_3$).

5. The membrane-electrode assembly of claim 1, wherein the ion conductive polymer comprises:
a porous reinforcing layer configured to be impregnated with the ion conductive polymer; and
an ion transport layer provided to at least one surface of the reinforcing layer and comprising the ion conductive polymer.

6. A method for manufacturing a membrane-electrode assembly, the method comprising:
preparing a dispersion liquid comprising a cerium precursor;
preparing a mixture comprising the dispersion liquid and an ion conductive polymer comprising proton conductive groups;
adding an acid solution to the mixture and reacting the mixture with the acid solution so as to combine cerium hydroxide ($Ce(OH)_3$) with all or some of the proton conductive groups;
manufacturing an electrolyte membrane as a product of the reaction; and
forming electrodes on both surfaces of the electrolyte membrane;
wherein the ion conductive polymer included in the product of the reaction comprises a carbon skeleton and a side chain of

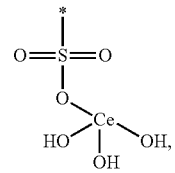

wherein * comprises an element of the carbon skeleton or an element of the side chain connected to sulfur (S).

7. The method of claim 6, wherein the cerium precursor comprises one selected from the group consisting of cerium isopropoxide ($Ce(OC_3H_7)_4$, cerium (III) acetate hydrate ($Ce(CH_3CO_2)_3 \cdot xH_2O$), cerium (III) acetylacetonate hydrate ($Ce(C_5H_7O_2)_3 \cdot xH_2O$), cerium (III) oxalate hydrate ($Ce_2$ $(C_2O_4)_3 \cdot xH_2O)$, cerium trifluoromethanesulfonate $(Ce_n(CF_3SO_3)_x \cdot H_2O)$ and combinations thereof.

8. The method of claim 6, wherein the dispersion liquid is prepared by dispersing the cerium precursor in a polar solvent comprising one selected from the group consisting of isopropanol, dimethylformamide and a combination thereof.

9. The method of claim 6, wherein the dispersion liquid is prepared by putting the cerium precursor into a solvent and then agitating an obtained mixture for 10 to 600 minutes.

10. The method of claim 6, wherein the proton conductive group comprises a sulfonic acid group.

11. The method of claim 6, wherein the ion conductive polymer comprises one selected from the group consisting of perfluorosulfonic acid, sulfonated poly(aryl ether ketone), sulfonated poly(arylene ether sulfone) and combinations thereof.

12. The method of claim 6, wherein a content of the cerium precursor included in the mixture is 0.01 to 20 wt % with respect to a total content of the cerium precursor and the ion conductive polymer.

13. The method of claim 6, wherein the mixture is prepared by mixing the dispersion liquid and the ion conductive polymer comprising the proton conductive groups and then agitating the mixed dispersion liquid and ion conductive polymer for 10 to 300 minutes.

14. The method of claim 6, wherein the acid solution is added to the mixture and the mixture is reacted with the acid solution at a temperature of 50° C. to 150° C. for 1 to 45 hours.

* * * * *